(12) United States Patent
Lent et al.

(10) Patent No.: US 11,748,133 B2
(45) Date of Patent: Sep. 5, 2023

(54) METHODS AND SYSTEMS FOR BOOTING VIRTUAL MACHINES IN THE CLOUD

(71) Applicant: NetApp, Inc., Sunnyvale, CA (US)

(72) Inventors: Arthur Lent, Newton, MA (US); Michael Condict, Hurdle Mills, NC (US); Peter Macko, Watertown, MA (US)

(73) Assignee: NETAPP, INC., San Jose, CA (US)

( * ) Notice: Subject to any disclaimer, the term of this patent is extended or adjusted under 35 U.S.C. 154(b) by 442 days.

(21) Appl. No.: 16/856,414

(22) Filed: Apr. 23, 2020

(65) Prior Publication Data

US 2021/0334123 A1 Oct. 28, 2021

(51) Int. Cl.
*G06F 9/455* (2018.01)
*G06F 9/4401* (2018.01)
*G06F 16/182* (2019.01)
*G06F 16/188* (2019.01)

(52) U.S. Cl.
CPC ........ *G06F 9/45558* (2013.01); *G06F 9/4406* (2013.01); *G06F 9/4411* (2013.01); *G06F 16/188* (2019.01); *G06F 16/1824* (2019.01); *G06F 2009/45575* (2013.01); *G06F 2009/45595* (2013.01)

(58) Field of Classification Search
CPC ............. G06F 9/45558; G06F 16/1824; G06F 15/188; G06F 9/4406; G06F 9/4411
See application file for complete search history.

(56) References Cited

U.S. PATENT DOCUMENTS

| | | | | |
|---|---|---|---|---|
| 8,464,034 B2* | 6/2013 | Lynn | ..................... | G06F 9/4401 713/1 |
| 8,874,888 B1* | 10/2014 | Beda, III | ............. | G06F 9/4406 718/1 |
| 8,954,718 B1* | 2/2015 | Raj | ..................... | G06F 9/45545 713/1 |
| 11,403,146 B2* | 8/2022 | Zhang | ..................... | G06F 9/445 |
| 2005/0038880 A1* | 2/2005 | Danforth | ................. | H04L 67/34 709/222 |
| 2014/0282548 A1* | 9/2014 | Lagergren | ........... | G06F 9/45558 718/1 |
| 2015/0319160 A1* | 11/2015 | Ferguson | ............ | G06F 21/6281 726/10 |
| 2017/0003977 A1* | 1/2017 | Sumida | ..................... | G06F 9/50 |
| 2017/0010897 A1* | 1/2017 | Matzek | ................... | G06F 3/067 |

(Continued)

*Primary Examiner* — Henry Tsai
*Assistant Examiner* — Christopher A Daley
(74) *Attorney, Agent, or Firm* — HAYNES AND BOONE, LLP

(57) ABSTRACT

A method, a computing device, and a non-transitory machine-readable medium for booting a virtual machine. In response to a launch or initialization of a virtual machine, the virtual machine may attach a boot volume within a cloud-associated storage system. The boot volume contains a boot program. The boot program is loaded to the virtual machine from the boot volume. The virtual machine uses the boot program to acquire a boot configuration that includes a set of parameters and one or more commands for interfacing with a networked storage system and attaching a root volume within the networked storage system using a network-based storage interface protocol. The virtual machine boots its operating system from the root volume within the networked storage system.

21 Claims, 6 Drawing Sheets

(56) References Cited

U.S. PATENT DOCUMENTS

| | | | |
|---|---|---|---|
| 2017/0012903 A1* | 1/2017 | Matzek | H04L 49/70 |
| 2017/0024224 A1* | 1/2017 | Bakke | G06F 9/4416 |
| 2021/0117330 A1* | 4/2021 | Lu | G06F 9/45533 |
| 2021/0182075 A1* | 6/2021 | Jain | G06F 9/4401 |
| 2021/0326150 A1* | 10/2021 | Raayman | H04L 12/4641 |
| 2022/0215111 A1* | 7/2022 | Ekins | G06F 21/6218 |

* cited by examiner

METHODS AND SYSTEMS FOR BOOTING VIRTUAL MACHINES IN THE CLOUD

TECHNICAL FIELD

The present description relates to booting computing machines via a cloud, and more specifically, to methods and systems for booting a virtual machine or a bare metal instance in a cloud using at least one root volume that is hosted on a third-party storage service.

BACKGROUND

Various computing platforms operate publicly and are cloud-based. Virtual machines (VM) instances, bare metal instances, or both may be launched using these computing platforms. A bare metal instance may be, for example, a single-tenant physical server that is deployable (e.g., rentable) on-demand. A virtual machine emulates a computer system. For example, a virtual machine may be based on computer architecture and provide the functionality of a physical computer. A cloud computing machine may be a virtual machine implemented in a cloud or a bare metal instance implemented in a cloud computing environment (or cloud). Booting a cloud computing machine, which includes booting an operating system for the cloud computing machine, may be performed using one or more volumes within a storage system that contain the operating system for the cloud computing machine and the system files for that operating system. Typically, the volume that contains the operating system for a cloud computing machine instance in a public cloud belongs to cloud-associated storage that is considered "attached" to the cloud computing machine. This cloud-associated storage may be provided or managed by the same provider of the cloud or a partner affiliated with that provider. For example, Amazon Web Services (AWS®), a public cloud services platform provided by Amazon®, allows Amazon Machine Images (AMI) to be used to create cloud computing machines. AWS® may natively support the backing of an AMI via, for example, a volume within Amazon Elastic Block Store (EBS), a persistent block-level storage system, or within Amazon Elastic Compute Cloud (Amazon EC2®), a temporary block-level storage system, both of which are provided by Amazon®. But in certain cases, these types of storage systems may not provide desired features for cloud computing machines. For example, these types of storage systems may not provide the space efficiency features or snapshot capabilities that a third-party storage service might provide.

BRIEF DESCRIPTION OF THE DRAWINGS

The present disclosure is best understood from the following detailed description when read with the accompanying figures.

DETAILED DESCRIPTION

Figure 1:
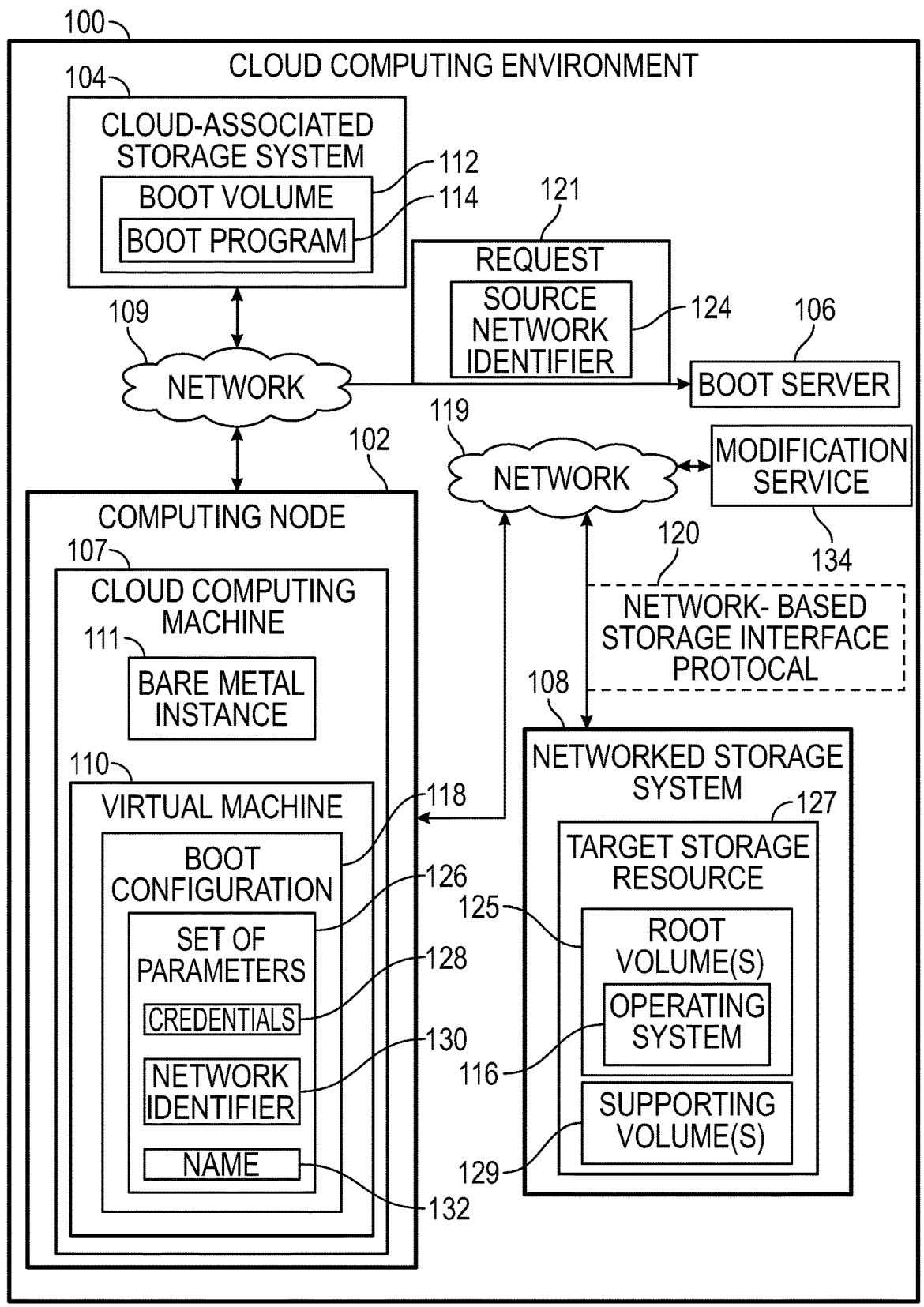
FIG. 1 is a block diagram illustrating a cloud computing environment in accordance with one or more example embodiments.

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

Various embodiments include methods, systems, and machine-readable media for booting a cloud computing machine operating in a cloud from at least one root volume within a networked storage system. A cloud computing machine may include a bare metal instance (e.g., a bare metal server), a virtual machine instance (e.g., a virtual server instance), or a combination or integration of the two. Although the embodiments are generally described with respect to virtual machines, similar principles and techniques may be applied to other types of cloud computing machines including, for example, bare metal instances.

Booting a virtual machine (or an instance of a virtual machine) within a cloud may include, for example, booting an operating system for the virtual machine from at least one root volume within a networked storage system. A root volume may contain a boot image that includes a copy of the operating system for the virtual machine and, oftentimes, at least one of applications, diagnostics, utilities, boot information, recovery information, configured services, or a combination thereof. In one or more other examples, these components may be distributed across multiple root volumes that may be loaded to boot the virtual machine. In some cases, booting the virtual machine may additionally include booting from one or more supporting volumes. For example, the root volume may include the operating system, while a supporting volume may include a bootloader for loading the operating system. In these cases, booting the virtual machine may include loading both the root volume and the supporting volume.

In one or more examples, the virtual machine interfaces with (or establishes communications with) the networked storage system, attaches the root volume, and boots its operating system from the root volume. This interfacing is achieved using a network-based storage interface protocol that the virtual machine itself may not be configured to support. Accordingly, this interfacing may be facilitated by a boot program that is booted to the virtual machine from a cloud-associated storage system. The virtual machine uses the boot program (e.g., boot firmware) to identify the information and commands needed to locate and attach the root volume within the networked storage system using the network-based storage interface protocol. The networked storage system, and thereby the root volume, may be block-based or file-based, depending on the desired implementation.

The boot program used by the virtual machine may be loaded from a boot volume within the cloud-associated storage system. The cloud-associated storage system may be considered "attached" to the virtual machine in that the cloud-associated storage system appears as if it is locally and directly connected to the virtual machine, even though communication occurs over a network. A volume of a storage system may be attached to a virtual machine directly or indirectly to make that volume accessible to the virtual machine. For example, a volume within a storage system may be "attached" to a virtual machine directly in that the volume appears to the software running in the virtual machine (e.g., the guest operating system, etc.) as if it were local. In another example, a volume within a storage system may be "attached" to a virtual machine indirectly in that the volume does not appear as if locally available to the virtual machine but the software running in the virtual machine (e.g., the guest operating system, etc.) is able to access the volume via a network-based protocol or via an intermediary (e.g., a boot program).

When initially launched, currently available virtual machines may be configured to load from an attached cloud-associated storage system but may not be configured to load from a networked storage system that uses a network-based storage interface protocol. In some cases, however, hosting the root volume with a networked storage system may provide opportunities for improved space efficiency, improved snapshot capabilities, and reduced expenses. For example, a data management system used to manage the networked storage system may provide capabilities beyond those available via the cloud-associated storage system. Accordingly, a user may be able to take advantage of these capabilities by configuring the virtual machine to load, from a boot volume within the cloud-associated storage system, a boot program that is capable of facilitating booting the virtual machine from the root volume stored in the networked storage system.

For example, the boot program residing on the boot volume (which may be also referred to as a bootstrap volume) may comprise bootstrapping code for attaching the root volume within the networked storage system to the virtual machine via the network-based storage interface protocol and booting the virtual machine from the root volume. More particularly, the virtual machine uses the boot program to identify a boot configuration that facilitates interfacing with the root volume, attaching the root volume, and booting from the root volume. The boot volume within the cloud-associated storage system may be persistent or temporary. When the boot volume is persistent, the boot volume remains available ("persists") regardless of the state of the virtual machine. In other words, the boot volume, when temporary, may persist independently of the life of the virtual machine. When the boot volume is temporary, the boot volume may be initialized from a master image and, at least from a user's point of view, disappear when the virtual machine is terminated. In other words, the boot volume does not remain available after the life of the virtual machine instance.

The boot program may acquire the boot configuration from either the boot volume itself or a different source, such as a boot server. For example, when the boot volume is persistent, the boot configuration may be stored in the boot volume or the boot server. When the boot volume is temporary, the boot configuration may be provided by the boot server or a source other than the boot volume. When the boot configuration is stored on the boot server, the virtual machine may use pre-stored information about the boot server (e.g., a host name, an IP address, etc.) to establish communications with and request the boot configuration from the boot server. The boot configuration identifies a set of parameters to establish communication with a networked storage system over a network using a network-based storage interface protocol. The set of parameters may include information for identifying and locating the root volume within the networked storage system. The boot configuration may further include commands for attaching the root volume to the virtual machine and booting the operating system from the root volume.

Thus, the methods, systems, and machine-readable media for booting a virtual machine described herein provide a solution for booting a virtual machine in a cloud from a root volume in external networked storage without the requirement of conversion or copying of the root volume to cloud-associated storage maintained by the cloud provider (or cloud vendor) or a partner affiliated with that provider. More particularly, the embodiments described herein allow the user to take advantage of the data management features provided in association with the external networked storage for the root volume of a virtual machine in a cloud, while bypassing specific application programming interfaces (APIs) that might otherwise be needed to convert or copy the root volume from the external networked storage to the storage maintained by the cloud provider. Further, the networked storage system may be associated with enterprise-grade data management that enables improved space efficiency, data recovery capabilities, data backup capabilities, and data restoration capabilities that might not be otherwise provided by or available from currently available public cloud-associated storage systems.

FIG. 1 is a block diagram illustrating a cloud computing environment 100 in accordance with one or more example embodiments. The cloud computing environment 100 may include a computing node 102, a cloud-associated storage system 104, a boot server 106, and a networked storage system 108. The cloud computing environment 100 may be operated using a cloud computing platform such as, for example, AWS®, Microsoft's Azure®, or some other cloud computing platform.

The computing node 102 may include hardware, software, firmware, or a combination thereof. For example, the computing node 102 may include a single computer or multiple computers in communication with each other. In one or more examples, the computing node 102 may be a service provided by or otherwise associated with one of the above-described cloud computing platforms. In one or more other examples, the computing node 102 is a device used to run one or more services or service instances of the cloud computing platform.

The computing node 102 may be in communication with the cloud-associated storage system 104 over a network 109. The network 109 may include any appropriate number of wired communications links, wireless communications links, optical communications links, or combination thereof. In one or more examples, the network 109 may be a cloud network and may include, for example, but is not limited to, the Internet, one or more local area networks (LAN), one or more wide area networks (WAN), one or more fibre channel networks, one or more intranets, one or more subnets, or a combination thereof. The computing node 102 may include or be associated with one or more network drivers that enable communications over the network 109.

The computing node 102 may be used to provision and deploy one or more instances of a cloud computing machine 107. The cloud computing machine 107 may be a physical and/or virtual machine within the cloud computing environment 100 (e.g., within the cloud). In one or more examples, the cloud computing machine 107 may be a virtual machine 110. In other examples, the cloud computing machine 107 may be a bare metal instance 111. The virtual machine 110 may emulate a computer system virtually, while the bare metal instance 111 may be a single physical server that is deployable (e.g., rentable) to a single tenant (e.g., customer) on-demand. Techniques for booting a cloud computing machine 107 are described below with respect to the virtual machine 100 but may be similarly applied to booting the bare metal instance 111.

In one or more examples, the computing node 102 may launch a virtual machine 110 (i.e., an instance of a virtual machine) that is backed by the cloud-associated storage system 104. For example, regardless of the implementation of the network 109 facilitating communication between the computing node 102 and the cloud-associated storage system 104, the cloud-associated storage system 104 may be considered "attached" to the virtual machine 110. More particularly, one or more volumes within the cloud-associated storage system 104 may appear to the virtual machine 110 as if they were directly attached (e.g., locally available) to the virtual machine 110. For example, the virtual machine 110 may use non-network-based storage interface protocols (e.g., Serial Advanced Technology Attachment (SATA) protocol, Small Computer System Interface (SCSI) protocol, etc.) to load data form the cloud-associated storage system 104.

The cloud-associated storage system 104 may take different forms. In one or more examples, the cloud-associated storage system 104 comprises persistent storage in which the data remains available, or persists, through instance stops, terminations, or hardware failures. For example, the cloud-associated storage system 104 may include block-level volumes that store data that persists independently of the life of the virtual machine. In one or more examples, the cloud-associated storage system 104 includes Amazon EBS volumes. In other examples, the cloud-associated storage system 104 comprises temporary instance storage (e.g., ephemeral storage) in which the data does not remain available, or persist, through instance stops, terminations, or hardware failures. For example, the cloud-associated storage system 104 may be a temporary instance store with block-level volumes that store data that disappears after the life of the virtual machine. In some cases, such as when the computing node 102 takes the form of a physical computing node (e.g., a computer), the block-level volumes of the temporary instance store may be stored on the computing node 102. In some examples, when the cloud computing machine 107 is the bare metal instance 111, the temporary instance store may be stored on the bare metal instance 111. In one or more examples, the cloud-associated storage system 104 includes Amazon EC2® instance store volumes. In some cases, the cloud-associated storage system 104 may alternatively include file-based volumes.

In one or more examples, the computing node 102 launches a virtual machine 110 and boots the virtual machine 110 from a boot volume 112 within the cloud-associated storage system 104. The boot volume 112 may be persistent or temporary, depending on the desired implementation. The boot volume 112 is persistent when the cloud-associated storage system 104 comprises persistent storage (e.g., Amazon EBS). The boot volume 112 is temporary when the cloud-associated storage system 104 is an instance store (e.g., Amazon EC2® instance store). For example, the boot volume 112 may be initialized from a master image (e.g., an AMI) via the instance store.

After the computing node 102 launches the virtual machine 110, an interface (e.g., a firmware interface) of the virtual machine 110 loads a boot program 114 from the boot volume 112 of the cloud-associated storage system 104. This interface may be, for example, a basic input/output system (BIOS), a Unified Extensible Firmware Interface (UEFI), or some other firmware interface of the virtual machine 110. The boot program 114 is used to facilitate booting an operating system 116 for the virtual machine 110 from the networked storage system 108 (e.g., from a root volume 125, as described in greater detail below). The boot program 114 may include boot firmware for use in booting the virtual machine 110. In one or more examples, the boot program 114 takes the form of Internet Preboot eXecution Environment (iPXE) boot firmware. iPXE is an open-source Internet implementation of the Preboot eXecution Environment (PXE) client firmware and bootloader. In other examples, the boot program 114 may include a different type of bootloader such as, for example, the Grand Unified Bootloader (GRUB).

This loading of the boot program 114 to the virtual machine 110 may be an "initial boot" or "pre-boot" that ultimately leads to the virtual machine 110 establishing communication with the networked storage system 108. The virtual machine 110 may use the boot program 114 to acquire a boot configuration 118 that enables the virtual machine 110 to interface with the networked storage system 108 over a network 119. For example, the networked storage system 108 may use a network-based storage interface protocol 120 to provide access to the one or more volumes within the networked storage system 108 over the network 119. The network-based storage interface protocol 120 may take the form of, for example the Internet Small Computer Systems Interface (iSCSI) protocol or some other type of network-based protocol. The network 119 may be different from the network 109 described above but may likewise include any number of wired communications links, wireless communications links, optical communications links, or combination thereof. In one or more examples, the network 119 may be a cloud network and may include the Internet, one or more local area networks (LAN), one or more wide area networks (WAN), one or more Internet area networks (IAN), one or more fibre channel networks, one or more intranets, one or more subnets, or a combination thereof. The virtual machine 110 may include or be associated with one or more network drivers that enable communications over the network 119.

As described above, once the boot program 114 is booted to the virtual machine 110 from the boot volume 112 of the cloud-associated storage system 104, the virtual machine 110 may use the boot program 114 to acquire the boot configuration 118. For example, the virtual machine 110 may use the boot program 114 to send a request 121 to the boot server 106 for the boot configuration 118. The virtual machine 110 may communicate with the boot server 106 over network 109 or another network. The boot server 106 may take a number of different forms. In one or more examples, the boot server 106 takes the form of a Hypertext Transfer Protocol (HTTP) server. When the boot program 114 includes iPXE boot firmware, the request 121 may include a "chain" command. In response to receiving the request 121, the boot server 106 may return the boot configuration 118 to the virtual machine 110 over network 109. When the boot program 114 takes the form of iPXE boot firmware, the boot server 106 may return the boot configuration 118 within a boot script.

The boot server 106 may determine which boot configuration 118 to return to the virtual machine 110 based on, for example, a source network identifier 124 associated with the request 121. The source network identifier 124 may include, for example, an IP address, a virtual local area network (VLAN) identifier, or both identifying the source (e.g., the virtual machine 110) of the request 121. For example, the boot server 106 may use a database to link a particular source network identifier 124 (e.g., an IP address) identifying the source of the request 121 to one of a plurality of files stored on the boot server 106, each of the plurality of files containing a boot configuration. The boot server 106 may retrieve the contents (e.g., the boot configuration 118) of the selected file and return the boot configuration 118 to the virtual machine 110. In some cases, the database may store a plurality of boot configurations and the boot server 106 may link the source network identifier 124 to a selected boot configuration 118 from the plurality of boot configurations. In other cases, the boot server 106 may identify the boot configuration 118 from a plurality of boot configurations based on the source network identifier 124 in some other manner.

In other examples, the boot server 106 may be optional. For example, rather than retrieving the boot configuration 118 from the boot server 106, the virtual machine 110 may retrieve the boot configuration 118 from the cloud-associated storage system 104. However, in some cases, when the boot volume 112 is temporary and initialized from a master image (e.g., an AMI), storing the boot configuration 118 on the boot server 106 may be more efficient. In other cases, when the boot volume 112 is persistent, storing the boot configuration 118 within a partition of the boot volume 112 or within a different volume within the cloud-associated storage system 104 may be more efficient.

The boot configuration 118 enables the virtual machine 110 to establish communication with the networked storage system 108 over the network 119 using the network-based storage interface protocol 120. More particularly, the boot program 114 running in the virtual machine 110 may use the boot configuration 118 to locate and attach at least one root volume 125 and, in some cases, at least one supporting volume 129 within the networked storage system 108 via the network-based storage interface protocol 120 over the network 119. Thus, the boot program 114 and the boot configuration 118 enable the virtual machine 110 to communicate with the networked storage system 108 via the network-based storage interface protocol 120.

The root volume 125 may contain a boot image that includes a copy of the operating system for the virtual machine and, oftentimes, at least one of applications, diagnostics, utilities, boot information, recovery information, configured services, or a combination thereof. In one or more other examples, these components may be distributed across multiple root volumes 125. In some cases, booting the virtual machine may additionally include booting from one or more supporting volumes 129. For example, the root volume 125 may include the operating system, while a supporting volume 129 may include a bootloader for loading the operating system. In other examples, multiple supporting volumes 129 may each contain a bootloader. These supporting volumes 129 may be used with one or more root volumes 125 to boot the virtual machine 110.

The boot configuration 118 may identify a set of parameters 126 that identify the root volume 125 and, in some cases, the target storage resource 127 within the networked storage system 108 on which the root volume 125 resides. The root volume 125 may be block-based or file-based, depending on the desired implementation. The target storage resource 127 may be, for example, storage identifiable via a logical unit number (LUN). The target storage resource 127 may include, for example, one or more physical or virtual (e.g., cloud) storage nodes that are assigned to a LUN. In some cases, the target storage resource 127 may be a Redundant Array of Independent (or Inexpensive) Disks (RAID) system. The set of parameters 126 may include, for example, credentials 128, a network identifier 130 for the root volume 125, a name 132 for the root volume 125, another parameter relating to the root volume 125 or the target storage resource 127, or a combination thereof. In these one or more examples, the credentials 128, the network identifier 130, the name 132, or a combination thereof may uniquely identify the root volume 125 and/or the target storage resource 127 with respect to the network-based storage interface protocol 120. The credentials 128 authorize the virtual machine 110 to access the target storage resource 127 and attach the root volume 125. The credentials 128 may be based on one or more different types of cryptographic protocols. For example, the credentials 128 may include a shared secret (e.g., a password, key word or phrase, etc.) based on the Challenge-Handshake Authentication Protocol (CHAP). The network identifier 130 may include, for example, an IP address, a virtual local area network (VLAN) identifier, or both for the root volume 125. The name 132 may include, for example, a hostname, an iSCSI name (e.g., an iSCSI Qualifying Name (IQN)), or both for the root volume 125.

Once the virtual machine 110 has established communication with the networked storage system 108 based on the boot configuration 118, the virtual machine 110 may boot the operating system 116 from the root volume 125 based on the boot configuration 118. For example, the virtual machine 110 may attach the root volume 125 and boot the operating system 116 from the root volume 125 based on commands included in the boot configuration 118.

In some cases, the root volume(s) 125, the supporting volume(s) 129, or both may be modified prior to being booted. For example, when the operating system 116 contained in the root volume 125 is the Microsoft Windows® operating system, the root volume 125 may be modified to allow the operating system 116 to be appropriately booted using the network-based storage interface protocol 120 (e.g., iSCSI). This type of modification may be useful in a recovery scenario in which, for example, a virtual machine instance that was originally running via an on-premises hypervisor (e.g., VMware) is recovered (e.g., booted) in the cloud. The modification may be performed by a modification service 134 that connects to the networked storage system 108 over the network 119 such as via the network-based storage interface protocol 120 (e.g., iSCSI). The modification service 134 may be implemented as part of a data management system (e.g., the data management system 210 described below in connection with FIG. 2), in the computing node 102, or in some other computing node or computing environment. Modification of the root volume 125 allows booting without having to run the virtual machine 110 on-premises. For example, the root volume 125 may be modified by adding device driver files, updating device driver files, updating configuration information, or a combination thereof. Further, in some cases, modifying the root volume 125 on the networked storage system 108 may obviate the need to install additional software on the virtual machine 110 while the virtual machine 110 is still running on-premises to thereby enable the virtual machine 110 to run smoothly within the cloud computing environment 100.

Figure 2:
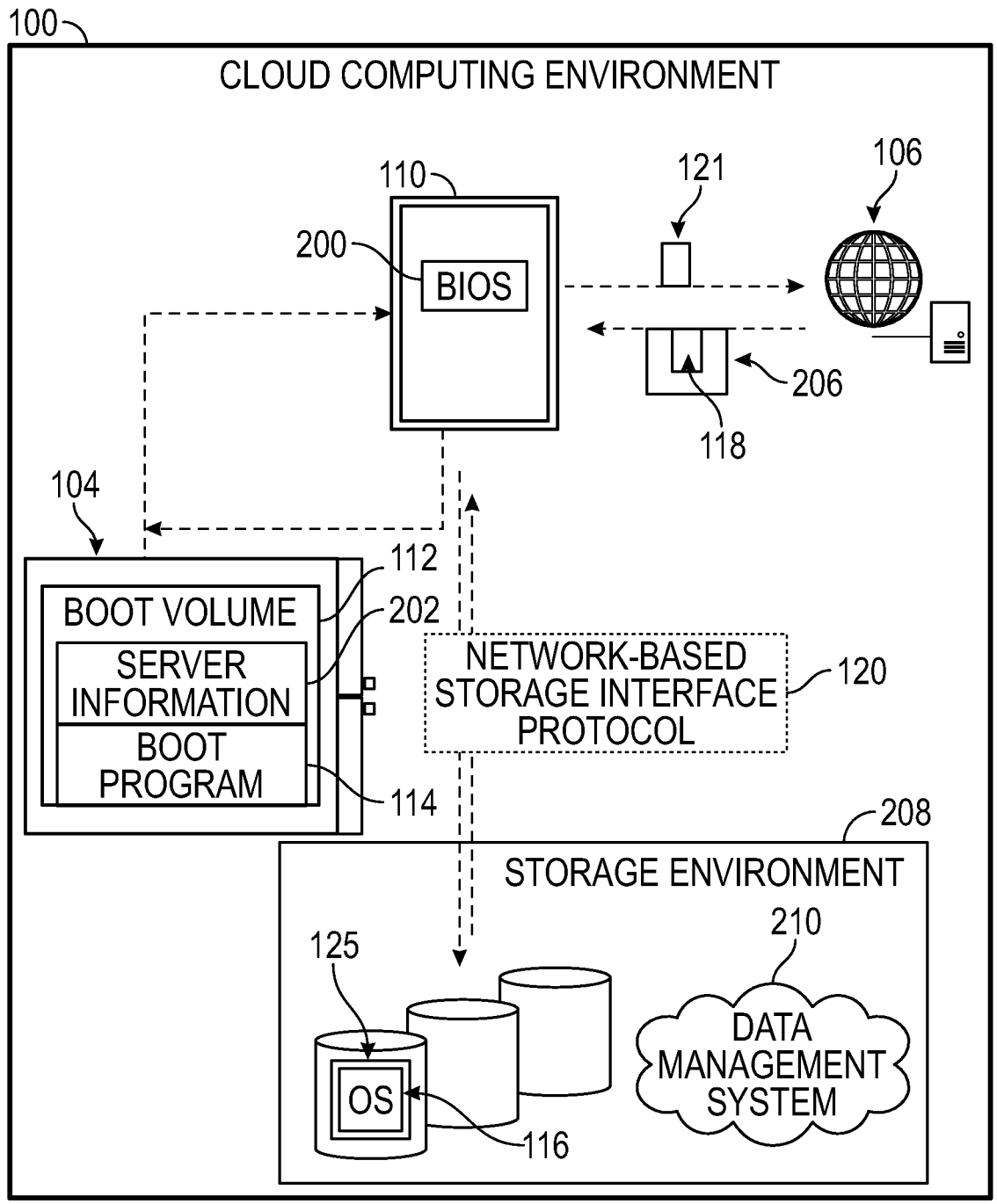
FIG. 2 is a schematic diagram of communications between a virtual machine, a cloud-associated storage system, a boot server, and a networked storage system in accordance with one or more example embodiments.

FIG. 2 is a schematic diagram of communications between a virtual machine 110, a cloud-associated storage system 104, a boot server 106, and a networked storage system 108, as introduced with respect to FIG. 1 above, in accordance with one or more example embodiments. More particularly, FIG. 2 illustrates an example of a manner in which the virtual machine 110 may be booted. When the virtual machine 110 is launched (or initialized), a BIOS 200 of the virtual machine 110 identifies the boot volume 112. The BIOS 200 loads the boot program 114 contained in the boot volume 112. Although the BIOS 200 is shown loading the boot program 114, in other examples, the virtual machine 110 may instead or additionally include a UEFI or some other type of firmware interface that loads the boot program 114.

In one or more examples, the boot program 114 includes iPXE boot firmware. The boot program 114 may include, for example, server information 202 relating to the boot server 106. The server information 202 may include, for example, an IP address for the boot server 106, a hostname for the boot server 106, other identifying information, or a combination thereof. In one or more examples, the boot program 114 may include information from which the server information 202 can be extrapolated. In still other examples, the server information 202 may be preloaded with virtual machine 110.

The virtual machine 110 uses the boot program 114 to send a request 121 to the boot server 106. The request 121 may identify, for example, the source network identifier 124 (FIG. 1) for the virtual machine 110. In one or more examples, the request 121 is included within or issued by a command (e.g., a chain command for iPXE). The boot server 106 may use the source network identifier 124 to retrieve a corresponding boot configuration 118. The boot server 106 may return the boot configuration 118 in a format supported by the boot program 114. For example, the boot server 106 may return a boot script 206 that includes the boot configuration 118 to the virtual machine 110. In other examples, the boot configuration 118 may be returned in some other format to the virtual machine 110.

The virtual machine 110 uses the set of parameters 126 identified in the boot configuration 118 to locate and attach the root volume 125 within the networked storage system 108 using, for example, the iSCSI protocol. In one or more examples, the networked storage system 108 may be part of a storage environment 208 that resides within the cloud computing environment 100. The storage environment 208 may be a cloud storage environment or an on-premises storage environment. In other examples, the storage environment 208 may reside within a different cloud in communication with the cloud computing environment 100, a co-located facility, or some other location. The operating system 116 stored in the root volume 125 is loaded to the virtual machine 100.

The networked storage system 108 may be managed by a data management system 210 that provides desired data management capabilities including, for example, improved space (or storage) efficiency, snapshot capabilities for disaster recovery and data backup, data replication capabilities (e.g., creating exact virtual copies or clones of data volumes, files, and LUNs without additional storage space without compromising performance or demanding additional storage space), other capabilities, or a combination thereof. The computing environment 500 described below in connection with FIG. 5 and the network environment 600 described below in connection with FIG. 6 may be examples of different implementations for the storage environment 208.

Figure 3:
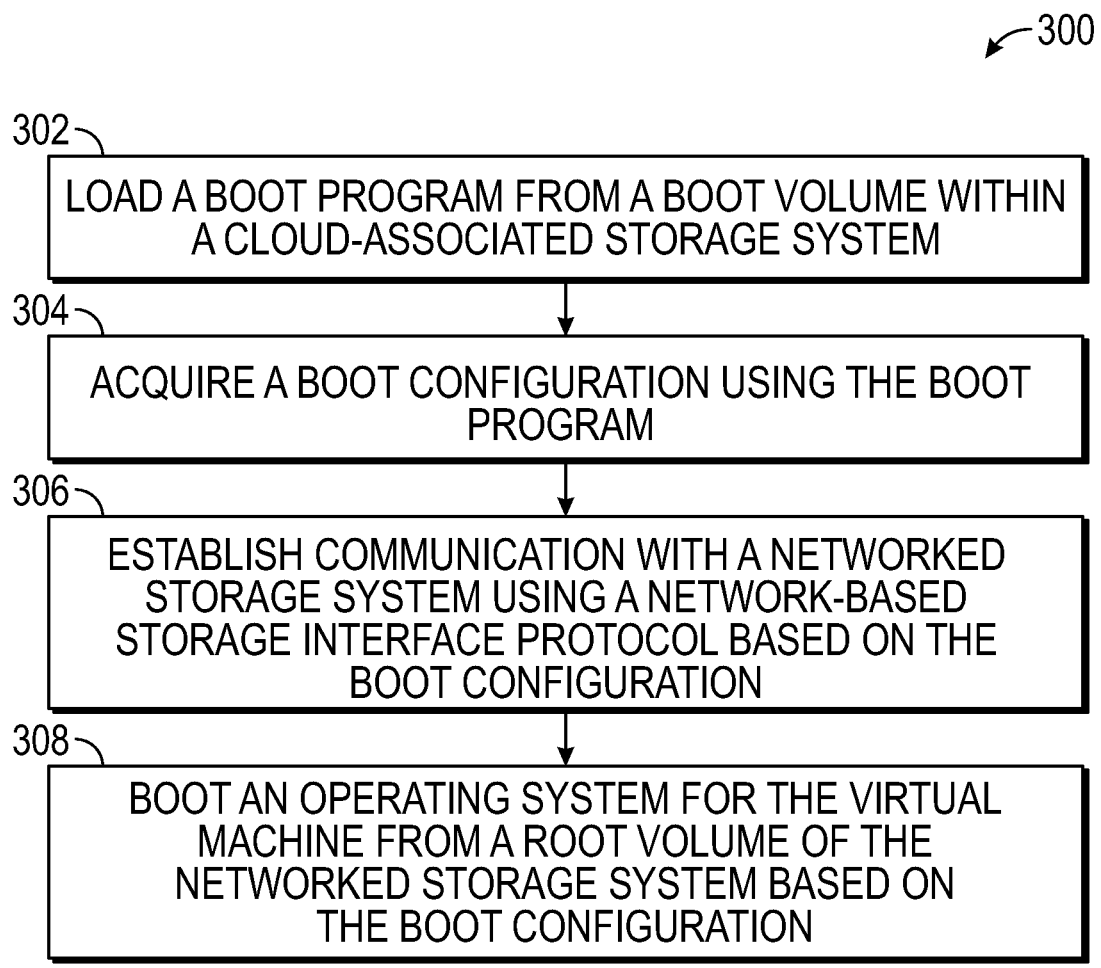
FIG. 3 is a flow diagram of a process for booting a virtual machine in accordance with one or more example embodiments.

FIG. 3 is a flow diagram of a process 300 for booting a virtual machine in accordance with one or more example embodiments. In one or more examples, the process 300 may be implemented by one or more processes of a computing node, such as the computing node 102 described in connection with FIG. 1, executing computer-readable instructions from one or more computer-readable media to perform the functions described herein. More particularly, the process 300 may be implemented by a virtual machine, such as, for example, the virtual machine 110 described in connection with FIGS. 1 and/or 2. It is understood that additional actions or operations can be provided before, during, and after the actions or operations of the process 300, and that some of the actions or operations described can be replaced or eliminated in other embodiments of the process 300.

The process 300 may begin by loading a boot program from a boot volume within a cloud-associated storage system to a virtual machine (operation 302). Operation 302 may be performed in response to that virtual machine being launched (or initialized). The boot volume may be, for example, the boot volume 112 within the cloud-associated storage system 104 described in connection with FIGS. 1 and/or 2. The boot volume (or bootstrap volume) may contain boot firmware, such as iPXE boot firmware, that enables communications via a network-based storage interface protocol.

The virtual machine acquires a boot configuration using the boot program (operation 304). The boot configuration may be, for example, the boot configuration 118 described in connection with FIGS. 1 and/or 2. Operation 304 may be performed in different ways. In one or more examples, the boot program acquires the boot configuration from a boot server, such as the boot server 106 described in connection with FIGS. 1 and/or 2. In one or more other examples, the boot program may acquire the boot configuration from the boot volume itself.

The virtual machine establishes communication with a networked storage system using a network-based storage interface protocol based on the boot configuration (operation 306). An operating system for the virtual machine is then booted from a root volume within the networked storage system based on the boot configuration (operation 308). For example, the virtual machine may use a set of parameters and one or more commands identified in the boot configuration and configured for the network-based storage interface protocol to locate and attach a root volume within the networked storage system. This attachment may be an indirect attachment. For example, the boot program may access the root volume via a network-based storage interface protocol (e.g., iSCSI) while making it appear to the one or more components (e.g., bootloader) of the operating system for the virtual machine as if the root volume is locally available. The virtual machine may then boot by loading the operating system from the root volume. At some point during the booting process, the operating system running in the virtual machine may be configured to start communicating with or directly accessing the root volume using the network-based storage interface protocol.

Figure 4:
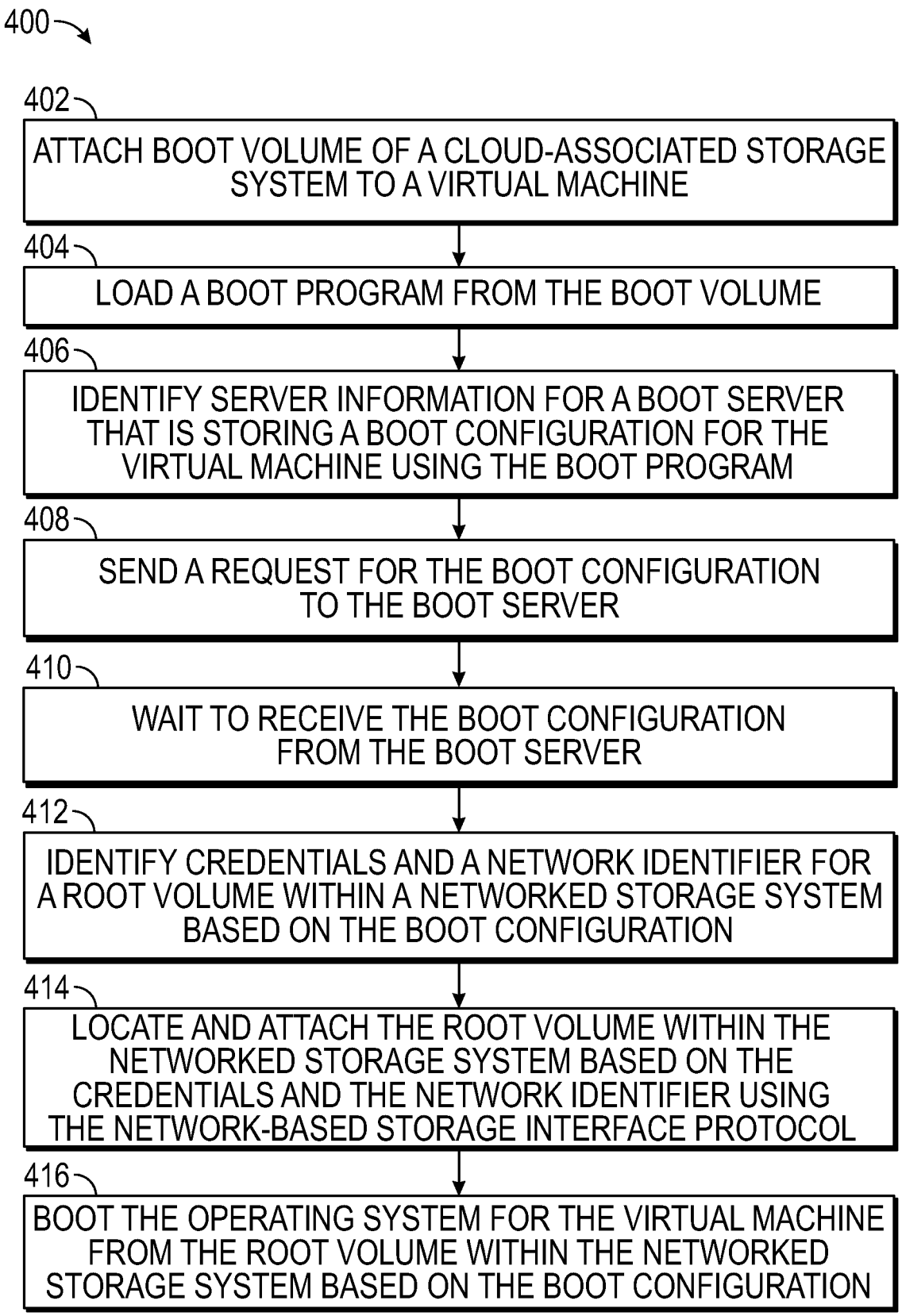
FIG. 4 is a flow diagram of a process for booting a virtual machine in accordance with one or more example embodiments.

FIG. 4 is a flow diagram of a process for 400 for booting a virtual machine in accordance with one or more example embodiments. In one or more examples, the process 400 may be implemented by one or more processes of a computing node, such as the computing node 102 described in connection with FIG. 1, executing computer-readable instructions from one or more computer-readable media to perform the functions described herein. More particularly, the process 400 may be implemented by a virtual machine, such as, for example, the virtual machine 110 described in connection with FIGS. 1 and/or 2. It is understood that additional actions or operations can be provided before, during, and after the actions or operations of the process 400, and that some of the actions or operations described can be replaced or eliminated in other embodiments of the process 400. The process 400 described in connection with FIG. 4 is an example of a more detailed implementation of the process 300 descried above in connection with FIG. 3.

The process 400 may begin by attaching a boot volume of a cloud-associated storage system to a virtual machine (operation 402). The virtual machine may be, for example, the virtual machine 110 described in connection with FIGS. 1 and/or 2. The cloud-associated storage system may be, for example, the cloud-associated storage system 104 described in connection with FIGS. 1 and/or 2. The boot volume may be persistent or ephemeral, depending on the desired implementation.

The virtual machine loads a boot program from the boot volume (operation 404). The boot program may include boot firmware. For example, the boot program may include iPXE boot firmware or some other type of boot firmware or bootloader that can facilitate interfacing with a networked storage system using a network-based storage interface protocol. Thus, the scope of embodiments is not limited to any particular firmware or protocol.

The virtual machine identifies server information for a boot server that is storing a boot configuration for the virtual machine using the boot program (operation 406). The server information may include, for example, an IP address of the boot server. The boot program sends a request (or command) for the boot configuration to the boot server (operation 408). In one or more examples, the request for the boot configuration is a request for a boot script that includes the boot configuration. In some cases, operation 408 includes sending a command that issues the request for a boot script that includes the boot configuration.

The virtual machine waits to receive the boot configuration from the boot server (operation 410). The boot server may use, for example, a source network identifier associated with the request to select a boot configuration from a plurality of boot configurations for the virtual machine. For example, the boot server may include a database linking different source network identifiers with different boot configurations. In other examples, the boot server may use other information included in the request to identify the appropriate boot configuration for the virtual machine.

In response to receiving the boot configuration, the virtual machine identifies credentials and a network identifier for a root volume within a networked storage system based on the boot configuration (operation 412). The network identifier may include, for example, an IP address, a VLAN identification, or both. The credentials are used to authenticate the virtual machine and enable the virtual machine to gain access to the root volume within the networked storage system. The credentials may take the form of, for example, a shared secret (e.g., a password, a key word or phrase, etc.).

The virtual machine locates and attaches the root volume within the networked storage system based on the credentials and the network identifier (operation 414). This attachment is performed using a network-based storage interface protocol. As one example, the virtual machine may use the boot configuration to identify the iSCSI identifying information for the root volume. More particularly, the attachment may be an indirect attachment. The attachment allows the root volume to appear locally available to one or more components of the operating system (e.g., a bootloader) for the virtual machine, where the boot program facilitates the communication between the root volume and the one or more components of the operating system.

The virtual machine then boots the operating system for the virtual machine from the root volume within the networked storage system based on the boot configuration (operation 416). For example, the boot configuration may include one or more commands that cause the virtual machine to boot its operating system from the root volume. In one or more examples, the operating system may be a Microsoft Windows® operating system or some other operating system (e.g., Linux®). In some examples, the operating system for the virtual machine may be booted from multiple root volumes. In other examples, the operating system for the virtual machine may be booted from one or more root volumes and one or more supporting volumes. Operation 416 may be performed by booting the operating system for the virtual machine using the contents of any number of volumes.

In one or more examples, operations 406-410 may be relied on for a first cycle of the process 400 to boot the operating system of a first instance of the virtual machine. In subsequent cycles of the process 400, these operations 406-410 may be skipped. For example, during the first cycle, the process 400 may include one or more additional actions that permanently configure the boot volume within the cloud-associated storage to include the boot configuration associated with the appropriate root volume for some or all subsequent boots. For example, the process 400 may include an action that adds the boot configuration to a partition within the boot volume. In other examples, the process 400 may include an action that adds the boot configuration to another partition or volume within the cloud-associated storage system.

Figure 5:
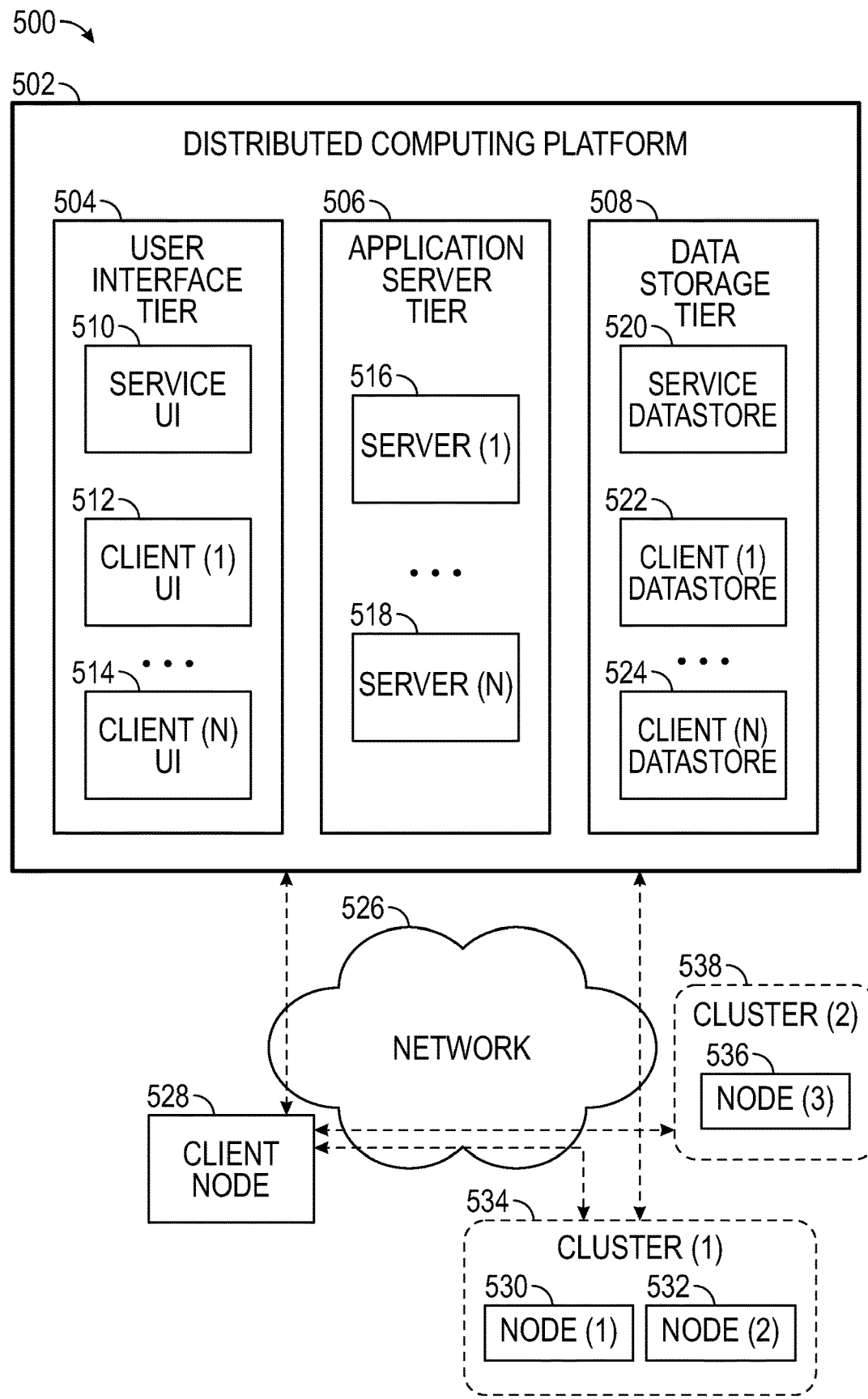
FIG. 5 is a diagram illustrating a computing environment in accordance with one or more example embodiments.

FIG. 5 is a diagram illustrating a computing environment 500 in accordance with one or more example embodiments. In one or more examples, at least a portion of the principles and techniques described with respect to FIG. 5 may be implemented within a cloud computing environment, such as the cloud computing environment 100 described above in connection with FIGS. 1-2. For example, distributing computing platform 502 may be an example of one implementation for the networked storage system 108 described above in connection with FIGS. 1 and/or 2. The root volume 125 described in connection with FIGS. 1 and/or 2 may, for example, be stored in the data storage tier 508 of the distributed computing platform 502.

In one example, the techniques described herein may include actions implemented within a client node 528, which may take the form of, for example, a laptop, a tablet, a personal computer, a mobile device, a server, a virtual machine, a wearable device, or some other type of client device. In another example, the techniques described herein may include actions implemented within one or more nodes, such as a first node 530 and/or a second node 532 within a first cluster 534, a third node 536 within a second cluster 538, or some other combination of nodes. A node may comprise a storage controller, a server, an on-premise device, a virtual machine such as a storage virtual machine, hardware, software, or combination thereof. The one or more nodes may be configured to manage the storage and access to data on behalf of the client node 528 and/or other client devices. The client node 528, the first node 530, the second node 532, and/or the third node 536 may each be an example of an implementation for the computing node 102 or the virtual machine 110 described in connection with FIG. 1.

In another example, the techniques described herein may be implemented within a distributed computing platform 502 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein include actions implemented across one or more of the client node 528, the one or more nodes 530, 532, and/or 536, and/or the distributed computing platform 502. For example, the client node 528 may transmit operations, such as data operations to read data and write data and metadata operations (e.g., a create file operation, a rename directory operation, a resize operation, a set attribute operation, etc.), over a network 526 to the first node 530 for implementation by the first node 530 upon storage. The first node 530 may store data associated with the operations within volumes or other data objects/structures hosted within locally attached storage, remote storage hosted by other computing devices accessible over the network 526, storage provided by the distributed computing platform 502, etc. The first node 530 may replicate the data and/or the operations to other computing devices, such as to the second node 532, the third node 536, a storage virtual machine executing within the distributed computing platform 502, etc., so that one or more replicas of the data are maintained. For example, the third node 536 may host a destination storage volume that is maintained as a replica of a source storage volume of the first node 530. Such replicas can be used for disaster recovery and failover.

In an embodiment, the techniques described herein include actions implemented by a storage operating system or are implemented by a separate module that interacts with the storage operating system. The storage operating system may be hosted by the client node 528, the distributed computing platform 502, or across a combination thereof. In an example, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 530, a cloud object stored by the distributed computing platform 502, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an in-core hash store, which maps fingerprints of data to data blocks of the storage device storing the data. Whenever data is to be written to the storage device, a fingerprint of that data is calculated, and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

In an example, various types of synchronization may be implemented by a synchronization module associated with the storage operating system. In an example, synchronous replication may be implemented, such as between the first node 530 and the second node 532. It may be appreciated that the synchronization module may implement synchronous replication between any devices within the computing environment 500, such as between the first node 530 of the first cluster 534 and the third node 536 of the second cluster 538 and/or between a node of a cluster and an instance of a node or virtual machine in the distributed computing platform 502.

As an example, during synchronous replication, the first node 530 may receive a write operation from the client node 528. The write operation may target a file stored within a volume managed by the first node 530. The first node 530 replicates the write operation to create a replicated write operation. The first node 530 locally implements the write operation upon the file within the volume. The first node 530 also transmits the replicated write operation to a synchronous replication target, such as the second node 532 that maintains a replica volume as a replica of the volume maintained by the first node 530. The second node 532 will execute the replicated write operation upon the replica volume so that file within the volume and the replica volume comprises the same data. After, the second node 532 will transmit a success message to the first node 530. With synchronous replication, the first node 530 does not respond with a success message to the client node 528 for the write operation until both the write operation is executed upon the volume and the first node 530 receives the success message that the second node 532 executed the replicated write operation upon the replica volume.

In another example, asynchronous replication may be implemented, such as between the first node 530 and the third node 536. It may be appreciated that the synchronization module may implement asynchronous replication between any devices within the computing environment 500, such as between the first node 530 of the first cluster 534 and the distributed computing platform 502. In an example, the first node 530 may establish an asynchronous replication relationship with the third node 536. The first node 530 may capture a baseline snapshot of a first volume as a point in time representation of the first volume. The first node 530 may utilize the baseline snapshot to perform a baseline transfer of the data within the first volume to the third node 536 in order to create a second volume within the third node 536 comprising data of the first volume as of the point in time at which the baseline snapshot was created.

After the baseline transfer, the first node 530 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 530 may store data or a portion thereof within storage hosted by the distributed computing platform 502 by transmitting the data within objects to the distributed computing platform 502. In one example, the first node 530 may locally store frequently accessed data within locally attached storage. Less frequently accessed data may be transmitted to the distributed computing platform 502 for storage within a data storage tier 508. The data storage tier 508 may store data within a service data store 520 and may store client specific data within client data stores assigned to such clients such as a client (1) data store 522 used to store data of a client (1) and a client (N) data store 524 used to store data of a client (N). The data stores may be physical storage devices or may be defined as logical storage, such as a virtual volume, LUNs, or other logical organizations of data that can be defined across one or more physical storage devices. In another example, the first node 530 transmits and stores all client data to the distributed computing platform 502. In yet another example, the client node 528 transmits and stores the data directly to the distributed computing platform 502 without the use of the first node 530.

The management of storage and access to data can be performed by one or more storage virtual machines (SVMs) or other storage applications that provide software as a service (SaaS) such as storage software services. In one example, an SVM may be hosted within the client node 528, within the first node 530, or within the distributed computing platform 502 such as by the application server tier 506. In another example, one or more SVMs may be hosted across one or more of the client node 528, the first node 530, and the distributed computing platform 502. The one or more SVMs may host instances of the storage operating system.

In an example, the storage operating system may be implemented for the distributed computing platform 502. The storage operating system may allow client devices to access data stored within the distributed computing platform 502 using various types of protocols, such as a Network File System (NFS) protocol, a Server Message Block (SMB) protocol and Common Internet File System (CIFS), and iSCSI, and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 502, one or more SVMs may be hosted by the application server tier 506. For example, a server (1) 516 is configured to host SVMs used to execute applications such as storage applications that manage the storage of data of the client (1) within the client (1) data store 522. Thus, an SVM executing on the server (1) 516 may receive data and/or operations from the client node 528 and/or the first node 530 over the network 526. The SVM executes a storage application and/or an instance of the storage operating system to process the operations and/or store the data within the client (1) data store 522. The SVM may transmit a response back to the client node 528 and/or the first node 530 over the network 526, such as a success message or an error message. In this way, the application server tier 506 may host SVMs, services, and/or other storage applications using the server (1) 516, the server (N) 518, etc.

A user interface tier 504 of the distributed computing platform 502 may provide the client node 528 and/or the first node 530 with access to user interfaces associated with the storage and access of data and/or other services provided by the distributed computing platform 502. In an example, a service user interface 510 may be accessible from the distributed computing platform 502 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 512, a client (N) user interface 514, etc. The client (1) can access various services and resources subscribed to by the client (1) through the client (1) user interface 512, such as access to a web service, a development environment, a human resource application, a warehouse tracking application, and/or other services and resources provided by the application server tier 506, which may use data stored within the data storage tier 508.

The client node 528 and/or the first node 530 may subscribe to certain types and amounts of services and resources provided by the distributed computing platform 502. For example, the client node 528 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 530 can establish a subscription to have access to certain services and resources of the distributed computing platform 502.

As shown, a variety of clients, such as the client node 528 and the first node 530, incorporating and/or incorporated into a variety of computing devices may communicate with the distributed computing platform 502 through one or more networks, such as the network 526. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 502, such as a multi-tenant business data processing platform or cloud computing environment, may include multiple processing tiers, including the user interface tier 504, the application server tier 506, and a data storage tier 508. The user interface tier 504 may maintain multiple user interfaces, including graphical user interfaces and/or web-based interfaces. The user interfaces may include the service user interface 510 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 510 may include components enabling a tenant to administer the tenant's participation in the functions and capabilities provided by the distributed computing platform 502, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 508 may include one or more data stores, which may include the service data store 520 and one or more client data stores 522-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the disclosure, the distributed computing platform 502 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 6:
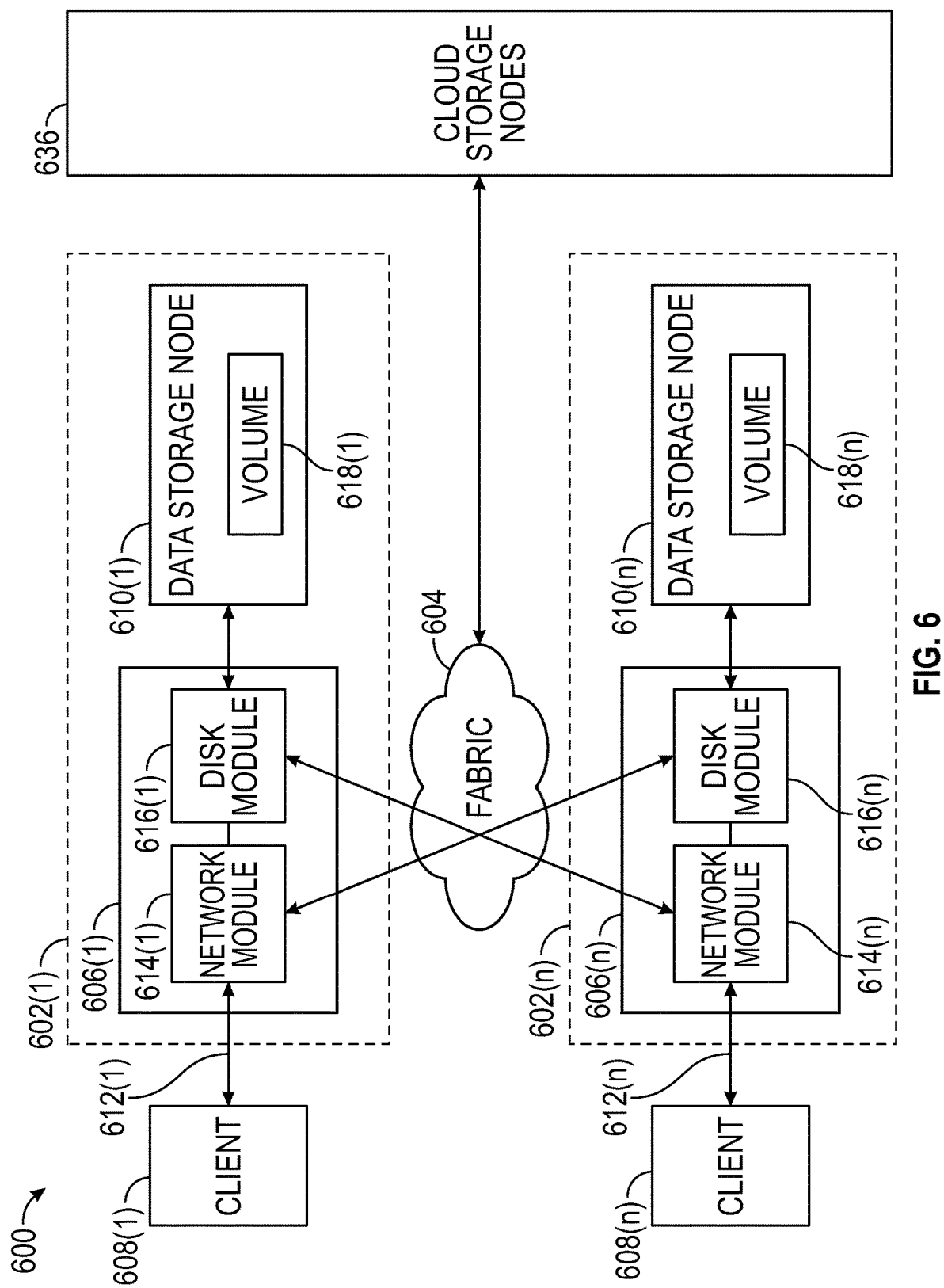
FIG. 6 is a block diagram illustrating a network environment in accordance with one or more example embodiments.

FIG. 6 is a block diagram illustrating a network environment 600 in accordance with one or more example embodiments. The network environment 600 illustrates another architecture for the principles described above with respect to FIG. 5. In one or more examples, at least a portion of the principles and techniques described with respect to FIG. 6 may be implemented within a cloud computing environment, such as the cloud computing environment 100 described above in connection with FIGS. 1-2. For example, the data storage apparatuses 602(1)-602(n), the cloud storage nodes 636, or both may form the networked storage system 108 described above in connection with FIGS. 1-2. The root volume 125 described in connection with FIGS. 1 and/or 2 may, for example, be stored in one or more of the data storage nodes 610(1)-610(n) or one or more of the cloud storage nodes 636. In some cases, at least one of the clients 608(1)-608(n) may be an example of an implementation for the computing node 102 or the virtual machine 110 described in connection with FIG. 1.

The network environment 600, which may take the form of a clustered network environment, includes data storage apparatuses 602(1)-602(n) that are coupled over a cluster or cluster fabric 604 that includes one or more communication network(s) and facilitates communication between the data storage apparatuses 602(1)-602(n) (and one or more modules, components, etc. therein, such as, node computing devices 606(1)-606(n) (also referred to as node computing devices), for example), although any number of other elements or components can also be included in the network environment 600 in other examples. This technology provides a number of advantages including methods, non-transitory computer readable media, and computing devices that implement the techniques described herein.

In this example, node computing devices 606(1)-606(n) can be primary or local storage controllers or secondary or remote storage controllers that provide client devices 608(1)-608(n) (also referred to as client nodes) with access to data stored within data storage nodes 610(1)-610(n) (also referred to as data storage devices) and cloud storage node(s) 636 (also referred to as cloud storage device(s)). The node computing devices 606(1)-606(n) may be implemented as hardware, software (e.g., a storage virtual machine), or combination thereof.

The data storage apparatuses 602(1)-602(n) and/or node computing devices 606(1)-606(n) of the examples described and illustrated herein are not limited to any particular geographic areas and can be clustered locally and/or remotely via a cloud network, or not clustered in other examples. Thus, in one example the data storage apparatuses 602(1)-602(n) and/or node computing device 606(1)-606(n) can be distributed over a plurality of storage systems located in a plurality of geographic locations (e.g., located on-premise, located within a cloud computing environment, etc.); while in another example a network can include data storage apparatuses 602(1)-602(n) and/or node computing device 606(1)-606(n) residing in a same geographic location (e.g., in a single on-site rack).

In the illustrated example, one or more of the client devices 608(1)-608(n), which may be, for example, personal computers (PCs), computing devices used for storage (e.g., storage servers), or other computers or peripheral devices, are coupled to the respective data storage apparatuses 602(1)-602(n) by network connections 612(1)-612(n). Network connections 612(1)-612(n) may include a LAN or WAN (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as SCSI or Fiber Channel Protocol (FCP), an object protocol, such as simple storage service (S3), and/or non-volatile memory express (NVMe), for example.

Illustratively, the client devices 608(1)-608(n) may be general-purpose computers running applications and may interact with the data storage apparatuses 602(1)-602(n) using a client/server model for exchange of information. That is, the client devices 608(1)-608(n) may request data from the data storage apparatuses 602(1)-602(n) (e.g., data on one of the data storage nodes 610(1)-610(n) managed by a network storage controller configured to process I/O commands issued by the client devices 608(1)-608(n)), and the data storage apparatuses 602(1)-602(n) may return results of the request to the client devices 608(1)-608(n) via the network connections 612(1)-612(n).

The node computing devices 606(1)-606(n) of the data storage apparatuses 602(1)-602(n) can include network or host nodes that are interconnected as a cluster to provide data storage and management services, such as to an enterprise having remote locations, cloud storage (e.g., a storage endpoint may be stored within cloud storage node(s) 636), etc., for example. Such node computing devices 606(1)-606(n) can be attached to the cluster fabric 604 at a connection point, redistribution point, or communication endpoint, for example. One or more of the node computing devices 606(1)-606(n) may be capable of sending, receiving, and/or forwarding information over a network communications channel, and could comprise any type of device that meets any or all of these criteria.

In an example, the node computing devices 606(1) and 606(n) may be configured according to a disaster recovery configuration whereby a surviving node provides switchover access to the data storage nodes 610(1)-610(n) in the event a disaster occurs at a disaster storage site (e.g., the node computing device 606(1) provides client device 608(n) with switchover data access to data storage nodes 610(n) in the event a disaster occurs at the second storage site). In other examples, the node computing device 606(n) can be configured according to an archival configuration and/or the node computing devices 606(1)-606(n) can be configured based on another type of replication arrangement (e.g., to facilitate load sharing). Additionally, while two node computing devices are illustrated in FIG. 6, any number of node computing devices or data storage apparatuses can be included in other examples in other types of configurations or arrangements.

As illustrated in the network environment 600, node computing devices 606(1)-606(n) can include various functional components that coordinate to provide a distributed storage architecture. For example, the node computing devices 606(1)-606(n) can include network modules 614(1)-614(n) and disk modules 616(1)-616(n). Network modules 614(1)-614(n) can be configured to allow the node computing devices 606(1)-606(n) (e.g., network storage controllers) to connect with client devices 608(1)-608(n) over the network connections 612(1)-612(n), for example, allowing the client devices 608(1)-608(n) to access data stored in the network environment 600.

Further, the network modules 614(1)-614(n) can provide connections with one or more other components through the cluster fabric 604. For example, the network module 614(1) of node computing device 606(1) can access the data storage node 610(n) by sending a request via the cluster fabric 604 through the disk module 616(n) of node computing device 606(n) when the node computing device 606(n) is available. Alternatively, when the node computing device 606(n) fails, the network module 614(1) of node computing device 606(1) can access the data storage node 610(n) directly via the cluster fabric 604. The cluster fabric 604 can include one or more local and/or wide area computing networks (i.e., cloud networks) embodied as Infiniband, Fibre Channel (FC), or Ethernet networks, for example, although other types of networks supporting other protocols can also be used.

Disk modules 616(1)-616(n) can be configured to connect data storage nodes 610(1)-610(n), such as disks or arrays of disks, SSDs, flash memory, or some other form of data storage, to the node computing devices 606(1)-606(n). Often, disk modules 616(1)-616(n) communicate with the data storage nodes 610(1)-610(n) according to the SAN protocol, such as SCSI or FCP, for example, although other protocols can also be used. Thus, as seen from an operating system on node computing devices 606(1)-606(n), the data storage nodes 610(1)-610(n) can appear as locally attached. In this manner, different node computing devices 606(1)-606(n), etc. may access data blocks, files, or objects through the operating system, rather than expressly requesting abstract files.

While the network environment 600 illustrates an equal number of network modules 614(1)-614(n) and disk modules 616(1)-616(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 608(1)-608(n) can be networked with the node computing devices 606(1)-606(n) in the cluster, over the network connections 612(1)-612(n). As an example, respective client devices 608(1)-608(n) that are networked to a cluster may request services (e.g., exchanging of information in the form of data packets) of node computing devices 606(1)-606(n) in the cluster, and the node computing devices 606(1)-606(n) can return results of the requested services to the client devices 608(1)-608(n). In one example, the client devices 608(1)-608(n) can exchange information with the network modules 614(1)-614(n) residing in the node computing devices 606(1)-606(n) (e.g., network hosts) in the data storage apparatuses 602(1)-602(n).

In one example, the data storage apparatuses 602(1)-602(n) host aggregates corresponding to physical local and remote data storage devices, such as local flash or disk storage in the data storage nodes 610(1)-610(n), for example. One or more of the data storage nodes 610(1)-610(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 618(1)-618(n) in this example, although any number of volumes can be included in the aggregates. The volumes 618(1)-618(n) are virtual data stores or storage objects that define an arrangement of storage and one or more filesystems within the network environment 600. Volumes 618(1)-618(n) can span a portion of a disk or other storage device, a collection of disks, or portions of disks, for example, and typically define an overall logical arrangement of data storage. In one example volumes 618(1)-618(n) can include stored user data as one or more files, blocks, or objects that may reside in a hierarchical directory structure within the volumes 618(1)-618(n).

Volumes 618(1)-618(n) are typically configured in formats that may be associated with particular storage systems, and respective volume formats typically comprise features that provide functionality to the volumes 618(1)-618(n), such as providing the ability for volumes 618(1)-618(n) to form clusters, among other functionality. Optionally, one or more of the volumes 618(1)-618(n) can be in composite aggregates and can extend between one or more of the data storage nodes 610(1)-610(n) and one or more of the cloud storage node(s) 636 to provide tiered storage, for example, and other arrangements can also be used in other examples.

In one example, to facilitate access to data stored on the disks or other structures of the data storage nodes 610(1)-610(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage nodes 610(1)-610(n) (e.g., a RAID system) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more LUNs, directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage nodes 610(1)-610(n) can have one or more physical ports, wherein each physical port can be assigned a target address (e.g., SCSI target address). To represent respective volumes, a target address on the data storage nodes 610(1)-610(n) can be used to identify one or more of the LUNs. Thus, for example, when one of the node computing devices 606(1)-606(n) connects to a volume, a connection between the one of the node computing devices 606(1)-606(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

As a result of the elements discussed above, examples of the present disclosure enable booting from root volumes hosted by third-party networked storage systems. The methods, systems, and machine-readable media described above provide techniques for booting a virtual machine over a network using a network-based storage interface protocol. In particular, the virtual machine may boot its operating system from a root volume(s) (e.g., the root volume(s) 125) and, in some cases, a supporting volume(s) (e.g., the supporting volume(s) 129) within the networked storage system using the network-based storage interface protocol. These embodiments may improve the overall functioning of a computer on which one or more instances of the virtual machine are running. For example, the overall functioning of the computer may be improved due to improved space (or storage efficiency) that is realized due to the root volume being booted over a network and the root volume being managed by an enterprise-grade data management system.

More particularly, storing the root volume 125 (and, in some cases, the supporting volume 129) on the networked storage system 108 may reduce the amount of data that may need to be stored due to the use of space efficiency features, such as deduplication, compression, and clones. Further, by storing the root volume 125 on the networked storage system 108 as compared to the cloud-associated storage system 104, storage space savings may be realized. Further, using the networked storage system 108, which may be managed by an enterprise-grade data management system 210, makes available encryption, snapshots, more efficient data transfer, more efficient backups, high availability, or a combination thereof. Further, using the techniques and systems described herein may reduce the overall amount of data being sent over the network, which may lead to time and cost savings due to less network bandwidth being used.

The present embodiments can take the form of an entirely hardware embodiment, an entirely software embodiment, or an embodiment containing both hardware and software elements. Accordingly, it is understood that any operation of the computing systems of the cloud computing environment 100, the computing node 102, the computing environment 500, and the network environment 600 may be implemented by a computing system using corresponding instructions stored on or in a non-transitory computer readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    loading a boot program from a volume of a cloud-associated storage system to a virtual machine;
    acquiring a boot configuration using the boot program, wherein the boot configuration is for use in establishing communication with a networked storage system using a network-based storage interface protocol;
    establishing the communication with the networked storage system using the network-based storage interface protocol based on the boot configuration; and
    booting an operating system for the virtual machine from a root volume within the networked storage system based on the boot configuration.

2. The method of claim 1, wherein the acquiring further comprises:
    receiving a boot script from a boot server over a network in response to a request sent to the boot server over the network, wherein the boot script includes the boot configuration.

3. The method of claim 1, wherein the acquiring further comprises:
    sending a request for the boot configuration to a boot server, wherein the boot server uses a source network identifier associated with the request to retrieve and send back the boot configuration.

4. The method of claim 1, wherein the establishing further comprises:
    establishing the communication with the networked storage system using credentials and a network identifier for the root volume identified via the boot configuration.

5. The method of claim 1, further comprising:
    modifying the root volume on the networked storage system for use with the network-based storage interface protocol prior to booting the operating system from the virtual machine from the root volume.

6. The method of claim 1, wherein the boot configuration is acquired from a boot server, the method further comprising:
    configuring the boot volume to include the boot configuration after the boot configuration has been acquired from the boot server.

7. A non-transitory machine-readable medium having stored thereon instructions for performing a method of booting a virtual machine, the non-transitory machine-readable medium comprising machine executable code which, when executed by at least one machine, causes the at least one machine to:
    load a boot program from a volume of a cloud-associated storage system to a virtual machine;
    send a request for a boot configuration to a boot server using the boot program;
    receive the boot configuration from the boot server, wherein the boot configuration is for use in establishing communication with a networked storage system using a network-based storage interface protocol;
    establish the communication with the networked storage system using the network-based storage interface protocol based on the boot configuration; and
    boot an operating system for the virtual machine from a root volume of the networked storage system based on the boot configuration.

8. The non-transitory machine-readable medium of claim 7, wherein the machine-executable code further causes the at least one machine, as part of the receiving, to:
    receive a boot script from the boot server over a network, wherein the boot script includes the boot configuration and the boot configuration identifies a network identifier for the root volume.

9. The non-transitory machine-readable medium of claim 7, wherein the machine-executable code further causes the at least one machine, as part of the receiving, to:
    receive a boot script from the boot server over a network, wherein the boot script includes the boot configuration and the boot configuration identifies credentials for authorizing the virtual machine accessing the root volume within the networked storage system.

10. The non-transitory machine-readable medium of claim 7, wherein the machine-executable code further causes the at least one machine, as part of the sending, to:
    identify server information for the boot server prior to sending the request to the boot server.

11. The non-transitory machine-readable medium of claim 7, wherein the machine-executable code further causes the at least one machine, as part of the establishing, to:
    establish the communication with the networked storage system using the network-based storage interface protocol based on credentials and a network identifier identified via the boot configuration.

12. The non-transitory machine-readable medium of claim 7, wherein the machine executable code further causes the at least one machine to:
    modify the root volume on the networked storage system for use with the network-based storage interface protocol prior to booting the operating system from the virtual machine from the root volume.

13. The non-transitory machine-readable medium of claim 7, wherein the machine executable code further causes the at least one machine to:
    configure the boot volume to include the boot configuration after the boot configuration has been acquired from the boot server.

14. A computing device comprising:
a memory containing machine readable medium comprising machine executable code having stored thereon instructions for performing a method of booting a virtual machine during input/output (I/O) operation; and
a processor coupled to the memory, the processor configured to execute the machine executable code to cause the processor to:
load a boot program from a volume of a cloud-associated storage system to the virtual machine;
establish communication with a networked storage system using a network-based storage interface protocol based on a boot configuration acquired via the boot program wherein the boot configuration includes a set of parameters for use in establishing the communication with the networked storage system using the network-based storage interface protocol; and
boot an operating system for the virtual machine from a root volume of the networked storage system based on the boot configuration.

15. The computing device of claim 14, wherein the processor is configured to execute the machine executable code to cause the processor to receive a boot script from a boot server over a network, wherein the boot script includes the boot configuration.

16. The computing device of claim 14, wherein the processor is configured to execute the machine executable code to cause the processor to send a request for the boot configuration to a boot server over Internet, wherein the boot server sends back a boot script that includes the boot configuration.

17. The computing device of claim 14, wherein the processor is configured to execute the machine executable code to cause the processor, as part of the establishing, to:
establish the communication with the networked storage system using the network-based storage interface protocol based on credentials and a network identifier identified via the boot configuration.

18. The computing device of claim 14, wherein the boot volume within the cloud-associated storage system is persistent.

19. The computing device of claim 14, wherein the processor is configured to execute the machine executable code to cause the processor to:
modify the root volume on the networked storage system for use with the network-based storage interface protocol prior to booting the operating system from the virtual machine from the root volume.

20. The computing device of claim 14, wherein the processor is configured to execute the machine executable code to cause the processor to:
configure the boot volume to include the boot configuration after the boot configuration has been acquired from the boot server.

21. The method of claim 1,
wherein establishing communication with the networked storage system is performed by a computing node on which the virtual machine runs, the computing node comprising a cloud computing machine that is coupled to the networked storage system via the network-based storage interface protocol, further wherein the computing node and the networked storage system are implemented within a cloud computing environment; and
the method further comprising locating and attaching the root volume, by the virtual machine, via the network-based storage interface protocol over a network between the computing node and the networked storage system.

* * * * *